May 11, 1943.   J. L. SPENCE, JR   2,319,092
SLACK CONTROLLER
Filed May 31, 1941
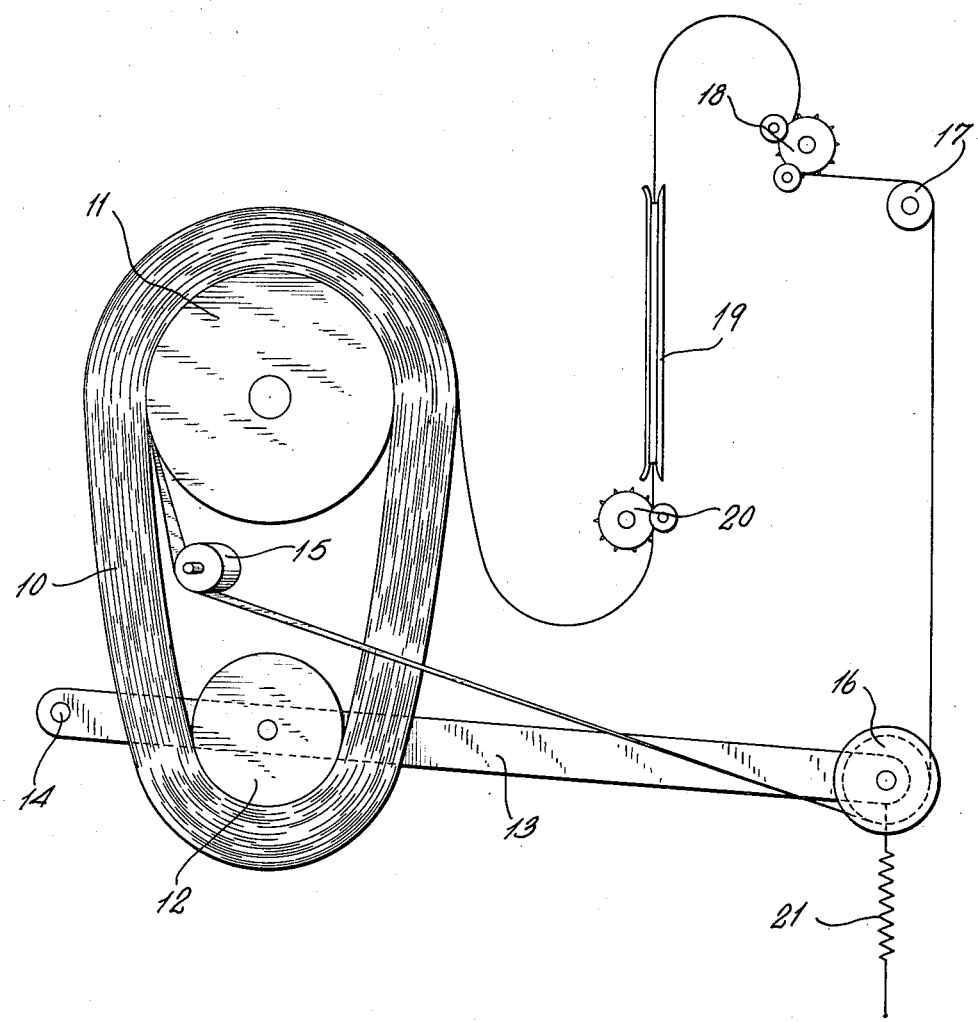
INVENTOR
John L. Spence, Jr
BY
Kenyon & Kenyon
ATTORNEYS Patented May 11, 1943

2,319,092

UNITED STATES PATENT OFFICE 2,319,092

SLACK CONTROLLER

John L. Spence, Jr., Brooklyn, N. Y., assignor to Leventhal Patents, Inc., New York N. Y., a corporation of Delaware Application May 31 1941, Serial No. 396,094

6 Claims. (Cl. 88—18.7)

This invention relates to a slack controller for endless loops of motion picture film.

In continuous motion picture projectors, such as those used for advertising purposes, a length of film is repeatedly projected. The film is in the form of an endless loop and for the purpose of conserving space the film usually is in the form of a coil supported on rollers. An endless loop of film wound in a coil has the difficulties that the layers may be wound too tight or too loose and that when properly wound for one condition of the film, it will not necessarly be properly wound for another condition. If the film becomes too tightly wound, it will break, whereas if it is too loosely wound, it will not wind up on the coil properly.

An object of this invention is mechanism for controlling the internal peripheral length of the coil so as to maintain a predetermined extent of slack and thereby maintain uniform conditions in the coil.

Other objects, novel features and advantages of this invention will become apparent from the following specification and accompanying drawing, wherein the single figure is a diagrammatic illustration of mechanism embodying the invention.

An endless loop of film in the general form of a coil 10 is supported by a roller 11 with the interior periphery of the coil being greater than the cirfumference of the roller. A second roller 12 arranged below the roller 11 engages the inner periphery of the coil 10 and is supported by a lever 13 pivoted at 14. From the roller 11, the film passes around a guide roller 15 and a roller 16 supported at the free end of the lever 13. From the roller 16, the film passes upwardly to an idler guide roller 17 located above the roller 16 and from thence to a projector feed roller 18. From the projector roller 18, the film passes through the usual film gate 19 and to a second projector feed roller 20, from which it passes back to the coil 10 to form the outer layer thereof. The projector rollers 18 and 20 are driven in the usual manner by suitable means (not shown), in timed relationship.

The rollers 11, 12, 15, 16 and 17 are mounted for free rotation and rotation thereof is effected by linear movement of the film produced by the projector rollers 18 and 20. The lever 13 is biased to tend to cause movement of the roller 12 away from the roller 11 either by gravity or by a spring 21. The spring 21 is used only when the arrangement is such that the lever 13 is not gravity biased or the weight of the lever and roller 16 is insufficient to supply the required degree of bias.

The inner periphery of the film coil is determined by the tension exerted on the film by the projector feed roller 18. When the tension on that portion of the film between the rollers 16 and 17 exceeds the bias exerted on the lever 13, the lever 13 swings counterclockwise to move the roller 12 toward the roller 11, thereby decreasing the internal periphery of the coil and supplying more slack thereto. When the tension on the film between the rollers 16 and 17 is exceeded by the bias applied to the arm 13, said arm swings clockwise, thereby moving the roller 12 away from the roller 11 to increase the internal periphery of the coil so that the coil will take up the slack produced by the decrease in tension.

In view of the fact that the single figure of the drawing is diagrammatic, the film gate appears to be in the same plane with the film coil, but it is to be understood that in a commercial embodiment of the invention the film gate is so arranged as to permit proper projection without interference with or by the remainder of the apparatus. Also, since the particular form of projector has no bearing on the invention, all illustration of a projector except the film gate has been omitted for the sake of simplifying the drawing.

I claim:

1. In combination, an endless loop of film in the form of a coil, a first roller and a second roller contacted by the inner turns of said coil, means supporting said second roller for movement relative to said first roller with said second roller being biased to move it away from said first roller, a third roller supported for movement with said second roller and film feeding means, said film passing from the inner coil of said endless loop to the outer coil thereof around said third roller and through said feeding means.

2. In combination, an endless loop of film in the form of a coil, a first roller and a second roller contacted by the inner turns of said coil, a lever supporting said second roller and biased to move said second roller away from said first roller, a third roller supported by said lever, and film feeding means, said film passing from the inner coil of said endless loop to the outer coil thereof around said third roller and through said feeding means.

3. The combination according to claim 1 characterized by the supporting means for said second roller being gravity biased.

4. The combination according to claim 1 characterized by the supporting means for said second roller being spring biased.

5. The combination according to claim 2 characterized by said lever being gravity biased.

6. The combination according to claim 2 characterized by said lever being spring biased.

JOHN L. SPENCE, JR.